Nov. 8, 1949        D. M. LIGHT        2,487,152
BRAKE HANGER DEVICE
Filed Sept. 7, 1945
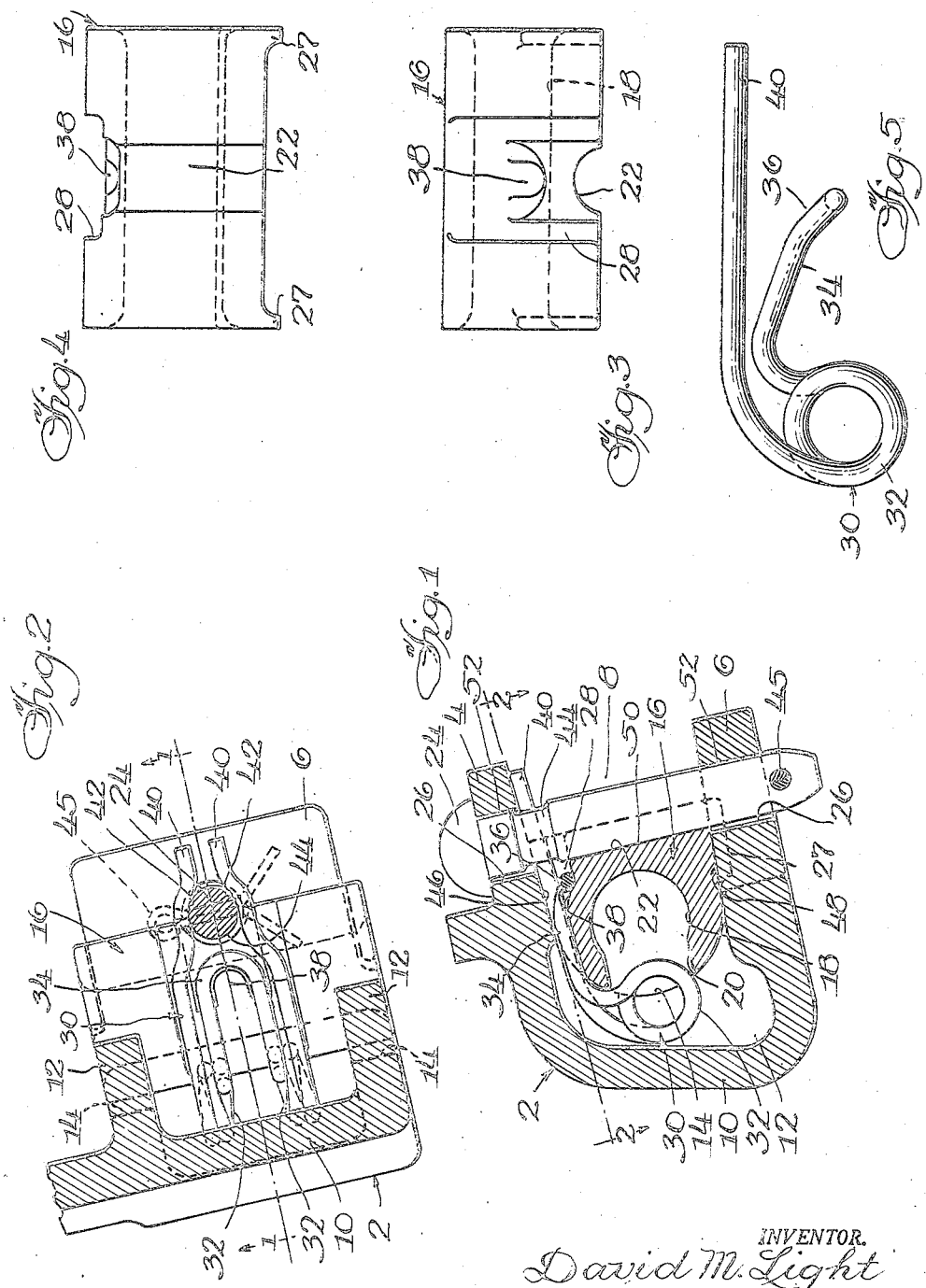
INVENTOR.
David M. Light
BY
Herbert J. Schmid
Atty.

Patented Nov. 8, 1949

2,487,152

UNITED STATES PATENT OFFICE 2,487,152

BRAKE HANGER DEVICE

David M. Light, Chicago, Ill.

Application September 7, 1945, Serial No. 614,862

20 Claims. (Cl. 188—205)

My invention relates to brake hanger retainers and more particularly to a novel retainer device adapted for use in the brake hanger bracket of a standard railway freight car truck.

A general object of the invention is to provide a novel brake hanger device including a block comprising a hanger socket, and anti-rattle spring means associated with said block.

Another object of the invention is to provide anti-rattle spring means so disposed as to prevent accidental disassembly of the hanger from the hanger socket of the block.

Still another object of the invention is to design the block and the hanger bracket with complementary wedge surfaces along which the block may be urged by the anti-rattle spring means into tight engagement with an associated retainer member carried by the bracket.

A different object of the invention is to provide novel anti-rattle spring means for a hanger block in a device such as that above-described, said spring means comprising means for gripping a retainer pin which is carried by the bracket for limiting outward movement of the block with respect thereto.

The invention comprises a novel double coil, anti-rattle, torsion spring with a bearing arm connected to corresponding ends of said coils, and a pair of separable bearing arms connected respectively to opposite corresponding ends of the coils, said separable arms comprising jaw means for gripping an associated retainer element.

The invention also comprises a novel brake hanger block comprising a brake hanger socket communicating with a slot at one end of the block, and a pin retainer groove in the opposite end of said block disposed perpendicularly to said socket, said block having on a side thereof guide means for cooperation with said bracket, and said block having on the opposite side thereof a recess with engaging means therein for an associated anti-rattle spring.

In the drawings:

Fig. 1 is a sectional view taken in a vertical plane approximately bisecting the device, as indicated by the line 1—1 of Fig. 2, the retainer pin being shown in elevation;

Fig. 2 is a sectional view taken in the plane indicated by the line 2—2 of Fig. 1;

Figs. 3 and 4 are respectively a top plan view and an end elevation of the brake hanger block shown in Figs. 1 and 2; and Fig. 5 is an enlarged side elevation of the anti-rattle spring.

Describing the invention in detail, the brake hanger bracket generally designated 2 is preferably formed as an integral part of a cast steel side frame for a standard freight car truck and comprises top and bottom webs 4 and 6 defining a diagonal jaw 8 therebetween, said bracket also comprising a rear wall 10 and spaced side walls 12, 12, each having an arcuate recess 14 to accommodate the complementary inner side of a hanger block generally designated 16.

The block 16 is preferably an iron casting or forging comprising a transverse hanger socket or cavity 18 (Fig. 1) opening into a slot 20 in the inner side of said block to accommodate assembly and disassembly of an associated conventional brake hanger (not shown) affording support means for associated wheel tread engaging brake means (not shown). The outer side of the block 16 is provided with a groove 22 perpendicular to the socket 18 and affording a suitable bearing surface for a retainer pin 24 extending through openings 26, 26 in the top and bottom webs 4 and 6 of the bracket 2.

The block 16 on the bottom side thereof is provided with spaced guide flanges 27, 27 for engagement with opposite sides of the web 6, and said block is provided with a recess 28 in the top side thereof for accommodation of an anti-rattle spring 30.

The spring 30 is in the form of a double coil torsion spring comprising spaced coiled springs 32, 32 partly housed in the slot 28 and having their adjacent ends connected to a bearing arm 34, the end of which is bent into a nose portion 36 engaged with an interlocking or positioning lug 38 on the block 16 within the recess 28. The opposite or remote ends of the springs 32, 32 are connected respectively to separable abutment arms 40, 40 which are provided with opposed jaws 42, 42 adapted to grip the pin 24 within a groove 44 therein to prevent accidental disassembly of said pin, which is additionally secured to the bracket 2 by a cotter pin 45.

The top and bottom surfaces of the block 16 which are engageable at 46 and 48 respectively against complementary surfaces on the top and bottom webs 4 and 6 to limit inward movement of the block 16 are so disposed as to converge inwardly with respect to the jaw 8. Thus the engaged surfaces at 48 function as wedge means causing the block to be urged by the spring 30 outwardly of the jaw 8 into tight engagement at 50 (Fig. 1) with the pin 24 which is thus urged into tight engagement at 52, 52 with the top and bottom webs 4 and 6 within the openings 26, 26. By means of this arragement, the pin 24, as well as the block 16, is held tightly against rattling under severe vibrations to which the device is subjected in railway service.

Referring now to Fig. 5, it will be seen that the arm 34 is divergent with respect to the arms 40, 40 prior to assembly of the spring 30 in the device as shown in Figs. 1 and 2.

It is to be understood that I do not wish to be limited by the exact embodiment of the device shown which is merely by way of illustration and not limitation, as various and other forms of the device will be apparent to those skilled in the art.

I claim:

1. In a brake hanger retainer device, a bracket, a block therein comprising a cavity adapted to contain an associated hanger, and anti-rattle spring means comprising a coil partly housed in the inner side of the block and having arms connected to opposite ends of the coil, one of the arms bearing directly against the block at a point above said cavity and the other arm bearing against a downwardly facing surface of the bracket above said cavity.

2. In a device of the class described, a hanger bracket comprising an internal wedge surface, a block within said bracket comprising a hanger socket and a wedge face bearing against said surface, a pin carried by said bracket and tightly abutting said block to maintain the latter within said bracket, and spring means bearing against a downwardly facing surface of said bracket above said block and bearing against said block above the socket for urging said face against said surface and thereby urging said block into said abutment with said pin.

3. In a device of the class described, a hanger bracket comprising an internal wedge surface, a block within said bracket comprising a wedge face bearing against said surface, a pin carried by said bracket and engaging said block to maintain the latter within said bracket, and spring means bearing against said bracket above said block and bearing against said block for urging said face against said surface, whereby said block is urged into tight engagement with said pin, said pin being interlocked with said spring means to limit movement of said pin axially thereof, to prevent accidental disassembly thereof.

4. In a device of the class described, a brake hanger bracket, a block therein comprising a hanger socket, readily removable interlocking means removably engaged with said bracket and said block for limiting movement of said block outwardly of said bracket, and anti-rattle means for said block and interlocking means comprising complementary wedge surfaces on said block and said bracket, and spring means reacting between said block and said bracket independently of said interlocking means for urging said surfaces into engagement, whereby said block is urged outwardly of said bracket along said surfaces into tight engagement with said interlocking means.

5. In a brake hanger retainer device, a brake hanger bracket, a removeable retainer element carried thereby, a brake hanger block in said bracket bearing against angularly related surfaces on said bracket and element respectively, said block comprising a hanger socket, and anti-rattle means associated with said block comprising spring means bearing against opposed abutments of said block and bracket respectively and flexed between said abutments independently of said element for urging said block into tight engagement with said surfaces.

6. In a brake hanger retainer device, a bracket comprising spaced webs and a rear wall defining a jaw, a hanger block in said jaw, said block comprising a hanger socket opening at the inner extremity of said block, and an anti-rattle torsion spring comprising a coil between said wall and said socket, said spring comprising portions connected to opposite ends of said coil and engaging respectively said block and one of said webs.

7. In a brake hanger retainer device, a bracket comprising spaced webs defining a jaw therebetween, a hanger block in said jaw comprising a hanger socket, a slot in said block at the inner end thereof communicating with said socket to accommodate assembly and disassembly of an associated hanger, and an anti-rattle torsion spring comprising spaced arms bearing respectively against said block and one web, and a coil connected at its opposite ends to respective arms, said coil being received within said slot to prevent accidental disassembly of said hanger from said socket.

8. A brake hanger mounting comprising a bracket with spaced webs, a block within said bracket having a transverse hanger socket, a hanger entry slot through the inner end of said block communicating with said socket, retainer means connected to said block to retain the latter in said bracket, and spring means for preventing rattling of said block comprising a pair of torsion coils partly housed in said slot, a pair of arms connected to the remote ends of respective coils and bearing against the underside of the top web, and an arm connected to the adjacent ends of said coils and bearing against the top of said block.

9. In a brake hanger retainer device, a bracket comprising spaced webs, a hanger block between said webs comprising support means for an associated hanger, retainer pin means carried by said bracket and engaged with said block, complementary wedge means on said block and one of said webs, and spring means reacting directly against said block independently of said support means and reacting against the other web independently of said pin means for urging said block along said wedge means into said engagement with said pin means.

10. In a brake hanger retainer device, a bracket comprising spaced webs, a hanger block between said webs, retainer pin means carried by said bracket and engaged with said block, complementary wedge means on said block and one of said webs, and spring means bearing directly against said block and reacting against the other web independently of said pin means for urging said block along said wedge means into said engagement with said pin means, said spring means being interlocked with said pin means to limit axial movement thereof and prevent accidental disassembly of the pin means.

11. In a brake hanger retainer device, a bracket, a block therein comprising a cavity adapted to contain an associated hanger, a coil spring in said bracket between the inner end thereof and the inner end of the block, and spaced arms connected to opposite ends of the coil spring, one arm bearing against an upwardly facing surface of the block above said cavity, and the other arm bearing against a downwardly facing surface of the bracket above said cavity.

12. In a brake hanger retainer device, a bracket, a block therein comprising a hanger socket, a transverse slot through said block at the inner extremity thereof and communicating with said socket to accommodate assembly and disassembly of an associated hanger with respect thereto, and anti-rattle means associated with said block comprising spring means compressed between adjacent portions of said block and said bracket, a portion of said spring means being received within said slot to prevent accidental disassembly of said hanger.

13. A hanger mounting according to claim 8, wherein the pair of arms clamp said retainer means to prevent accidental disassembly thereof.

14. In a brake hanger block, a member with a transverse hanger socket therethrough, guide means on a side of said member for cooperation with associated support means, and interlocking means on the opposite side of said member for an associated anti-rattle spring, said interlocking means comprising a recess in said member with a relatively shallow portion above the socket and a relatively deep portion rearwardly of the socket, and a lug on said member extending from said shallow portion into deep portion and providing an arcuate surface therein for engagement with said spring.

15. In a brake hanger retainer device, a bracket, a block therein comprising a cavity adapted to contain an associated hanger, said cavity being open at the inner side of said block, and anti-rattle spring means reacting between said block and said bracket, a portion of said spring means being disposed at the open side of said cavity obstructing movement of said hanger therefrom.

16. In a brake hanger bearing block, a member having a transverse hanger socket therethrough, said socket being open at the forward side of said member, top and bottom bearing surfaces on said member converging toward the forward side thereof, guide means interrupting one of said faces and adapted for cooperation with an associated support element, and interlocking means interrupting the other of said faces comprising a recess and a lug therein adapted to interlock the block with an associated anti-rattle spring.

17. A brake hanger mounting, comprising a bracket with spaced webs, a block in said bracket between said webs, a hanger socket in said block, open at the inner end thereof, a recess in the top of said block, a lug on said block in said recess, spring means anchored to said lug and reacting against one of the webs and against said block for urging the latter against the other web, said spring means being disposed at the open side of said socket and being adapted to close the same against accidental dislodgment therefrom of an associated hanger.

18. In a brake hanger block, a member having a transverse hanger socket closed at the top and bottom thereof and open at one end of the member to accommodate insertion and removal of a hanger, and a retainer groove in the opposite end of said member arranged approximately perpendicularly to said socket.

19. A brake hanger block according to claim 18, wherein the top of the block is provided with spring positioning means.

20. In a brake hanger retainer device, a bracket, a block therein adapted to afford support for an associated hanger, a pin carried by said bracket to retain said block therein, and anti-rattle means comprising a spring reacting against a downwardly facing surface on said bracket above said block and against an upwardly facing surface on said block, said spring comprising a portion below the first-mentioned surface interlocked with said pin against accidental axial movement thereof.

DAVID M. LIGHT.

REFERENCES CITED

The following references are of record in the file of this patent:

UNITED STATES PATENTS

| Number | Name | Date |
| --- | --- | --- |
| 895,842 | Chambers | Aug. 11, 1908 |
| 1,190,908 | Kafader | July 11, 1916 |
| 1,461,549 | Withrow et al. | July 10, 1923 |
| 1,804,146 | Busse | May 5, 1931 |
| 1,820,721 | Withrow | Aug. 25, 1931 |
| 2,188,268 | Light | Jan. 23, 1940 |
| 2,194,445 | Light | Mar. 19, 1940 |
| 2,232,468 | Oelkers | Feb. 18, 1941 |
| 2,405,356 | Jahn | Aug. 6, 1946 |